May 27, 1958  H. O. G. KUBLER ET AL  2,836,377
THREAD TENSIONING DEVICE FOR A SPINDLE
Filed Aug. 11, 1955
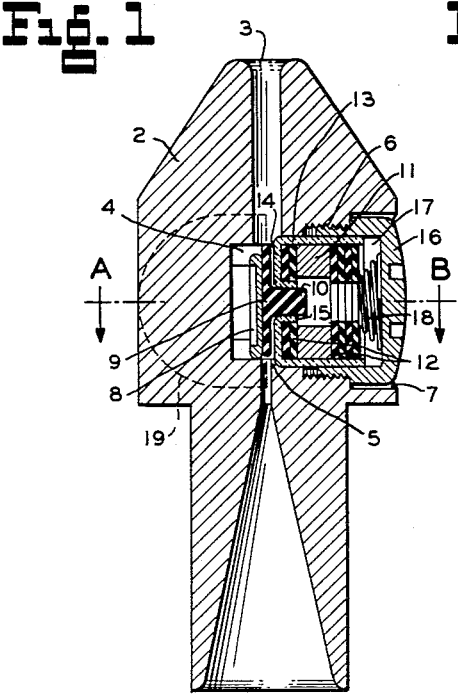
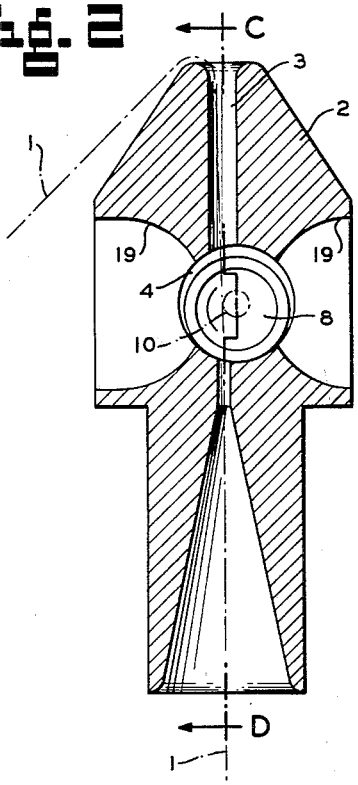
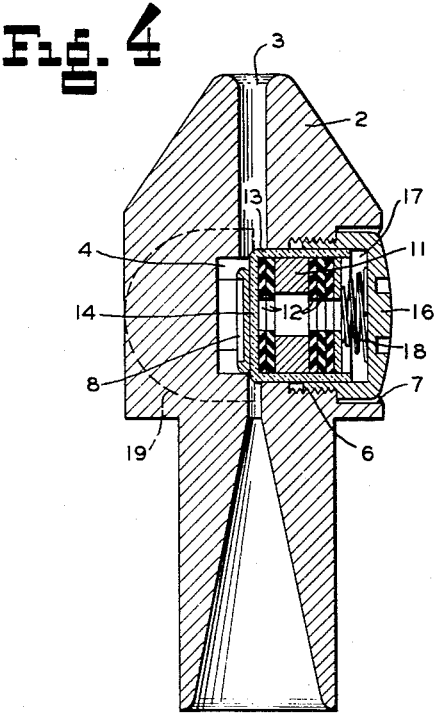
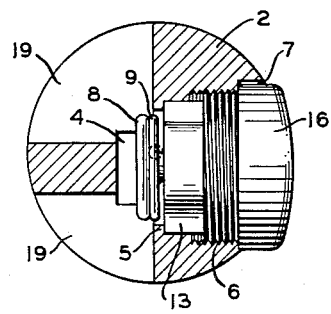
INVENTORS
HERMANN OTTO GUSTAV KUBLER
OTTO BOCHMANN
BY
ATTORNEY United States Patent Office 2,836,377
Patented May 27, 1958

2,836,377

THREAD TENSIONING DEVICE FOR A SPINDLE

Hermann Otto Gustav Kubler and Otto Bochmann, Remscheid-Lennep, Germany, assignors to Barmer Maschinenfabrik Aktiengesellschaft, Wuppertal-Oberbarmen, Germany, a corporation of Germany Application August 11, 1955, Serial No. 527,713

Claims priority, application Germany October 9, 1954

11 Claims. (Cl. 242—150)

The present invention relates to a thread tensioning device for thread spindles, and more particularly for multiple-wire thread spindles in which the thread is guided through a disc brake disposed in the middle of the spindle.

There are known tensioning devices mounted in the run-in member for the thread, and employing spring operated disc brakes, the braking surface of which are disposed in the direction of the bore for the passage of of the thread. They have the disadvantage that the threads groove the disc after a rather short period of use even if the discs are made of the hardest available material, whereby the threads are damaged. Furthermore, due to spring fatigue the spring pressure does not remain permanently constant.

There are further known brakes employing pressure produced by magnets. While permanent magnets as used for the purpose are inexpensive and reliable, they require a horizontal mounting of the brake discs. Experience has shown that the magnetic attraction of a permanent magnet of practical size is not sufficient safely to retain and guide a vertically disposed magnetic brake disc. Sufficiently powerful electromagnets occupy more space than is generally available in a run-in member of a multiple wire thread spindle. When the brake discs are horizontally disposed, the thread coming from above has to be guided first about the circumference of the upper disc and then through a centric hole in the lower disc. The resulting strong bending of the thread entails the disadvantage that the threads must be subjected to an undesirable high drawing force.

There are also known disc brakes which are rotatable on pivots. In such brakes, the thread is eccentrically guided between the discs and causes rotation of the entire brake. The rotation of the discs eliminates grooving of the discs and the resulting damage to the threads whereby the useful life of the discs is correspondingly extended and slackening of the braking action is also prevented. However, the brake design requires guidance of the threads closely anterior and posterior of the discs. It also requires a substantial pre-tensioning of the thread to prevent the thread from leaving the rotating discs which would make the brake entirely ineffective. In practice, it is not always possible to impart the required pre-tensioning of the incoming thread, especially not when multiple-wire thread spindles with overhead draw are used.

Accordingly, one of the objects of the present invention is to provide a novel and improved disc brake of the general kind above referred to, the discs of which are vertically disposed and the action of which avoids damage to the thread without requiring a substantial pre-tensioning of the thread.

More specifically, one object of the invention is to provide a novel and improved disc brake the discs of which are vertically disposed and biased toward each other by a permanent magnet to reduce the required space to a minimum and to assure constant pressure between the discs. The discs are rotated to prevent premature wear and tear of the working surfaces of the discs and the resulting damage to the thread without the heretofore concomitant danger of the thread leaving the discs unless subjected to a considerable pre-tensioning. As will more fully appear from the subsequent description, with the brake design according to the invention the thread remains between the discs even with the weakest pre-tensioning or strongly varying tensions.

According to a preferred embodiment of the invention the disc brake is fitted in the run-in member transversely and slightly eccentrically relative to the passage bore for the thread. The discs of the brake are disposed in the direction of the travel of the thread and biased toward each other by a permanent magnet. The tension of the thread is controlled by selectively exchangeable and distributable spacers which together with the magnet are housed within a cup-shaped casing. This casing is fitted in a blind hole provided in the run-in member transversely to the direction of travel of the thread and secured in the hole by a closure such as a threaded stopper. To prevent interference with the magnetic field of the magnet, the casing is made of non-magnetic transparent material such as polysterol. A loaded spring acting upon the magnet and the spacers retains the casing always in the same position, for instance, by pressing it against a shoulder formed in the blind hole of the run-in member. The magnet and the spacers are distributed within the casing in accordance with the desired tension of the thread. It is further contemplated to adjust the tension of the thread by correlating the combined length of the magnet and the spacers, so that the magnet or the spacers abut directly against the stopper, in which event the spring is omitted.

The bottom of the casing preferably mounts a bush in which is journalled the pivot of a non-magnetic brake disc so that the disc is in frictional contact with the small area of the bush only to reduce the frictional resistance to a minimum. The other and magnetic brake disc which is attracted by the magnet against the non-magnetic disc just fits the peripheral outline of the blind hole so that it can rotate but not tilt in the hole. The thread eccentrically guided between the discs causes rotation of both discs but since the respective frictional bearing resistances of the two discs are quite different one from the other due to the different mounting of the discs, the revolutionary speed of one of the discs namely one of the discs journalled in the bush, will be considerably faster than that of the other disc which experiences a compartively high friction along its periphery.

This differential rotational speed of the discs serves to retain the thread between the discs. If the discs would rotate at the same rate of speed, a thread having a low pre-tension as is generally used for overhead draw and especially for fine threads would be forced out of its position between the discs due to the adhering properties of the finishing on the thread. As a result, a uniform braking effect would no longer be obtained.

Broadly, the retention of the thread between the discs is always obtained when the discs perform any differential movement in their respective planes. For instance, one disc may be stationary and the other rotated. This makes it possible to guide and brake the thread between the magnetic disc and the then flat bottom of the casing which thus may be used as a substitute for the non-magnetic disc.

The casing may be made of transparent material and the run-in member may have a window or windows to supervise the brake especially during assembly and to clean the parts thereof.

Other and further objects, features and advantages of the invention will be pointed out hereinafter and set forth in the appended claims forming part of the application.

In the accompanying drawing several preferred embodiments of the invention are shown by way of illustration and not by way of limitation.

In the drawing:

Fig. 1 is an elevational sectional view taken on line C—D of Fig. 2 through the run-in member of a multiple-wire thread spindle in which member is fitted a brake according to the invention.

Fig. 2 is a longitudinal section through Fig. 1 but turned through 90°.

Fig. 3 is a section taken on line A—B of Fig. 1, and

Fig. 4 is an elevational sectional view similar to Fig. 1 but showing a modification of the brake.

Referring first to Figs. 1, 2, and 3 in detail, these figures show a run-in member 2 having an axial bore 3 for the passage of the thread. The thread is guided without appreciably changing its direction between a magnetic brake disc 8 and a non-magnetic brake disc 9. The two brake discs are disposed within a recess or blind hole 4 situated transversely and slightly eccentrically to the axis of bore 3 to guide the thread eccentrically between the discs. Both discs are rotatable and are rotated by the thread 1 when passing through bore 3 and eccentrically between the discs whereby grooving of the working surfaces of the discs is avoided. A permanent magnet produces the necessary braking pressure between the two discs by attracting magnetic disc 8. The braking pressure between the discs can be conveniently controlled by selectively distributing spacer discs 12 as will be more fully described hereinafter. The magnetic disc 8 is fitted in blind hole 4 so that it can rotate but has not sufficient clearance to tilt. A cup-shaped casing 13 is also fitted in hole 4. The casing 13 serves to house magnet 11 and spacers 12. It further serves to form a bearing for the non-magnetic disc 9. For this purpose a bush 15 is fitted in a hole in the bottom 14 of the casing and a pivot 10 on disc 9 is journalled in bush 15. To facilitate rotation of the discs by a thread which may be extremely fine, the non-magnetic disc 9 is made of a material as light as possible. The disc may be advantageously produced by means of a spraying process employing synthetic linear super-polyamides. This material simultaneously prevents appreciable rubbing off of the finishing of the thread.

Due to the different mounting of the two discs and the resulting differential frictional resistance in the bearings, the two discs assume a differential revolutionary speed by the action of the passing thread. The magnetic disc 8 will rotate considerably slower due to its higher peripheral friction than the non-magnetic disc 9 the bearing of which is formed by the pivot 10 journalled in bush 15. To prevent magnetic interference of casing 13 and spacers 12 with the magnetic attraction of magnet 11, both the casing and the spacers are made of non-magnetic material.

The casing is retained in a definite position within blind hole 4 by providing a shoulder 5 in hole 4 and a closure member 16. The closure member shown as a stopper is threaded in a corresponding thread 6 provided in hole 4. The head or bottom portion of the stopper fits in a correspondingly widened part 7 of hole 4 so that the stopper is substantially flush with the outer peripheral outline of run-in member 2. A loaded spring 18 fitted in the space 17 between the bottom of the stopper and the adjacent spacer 12 biases casing 13 against shoulder 5 of blind hole 4 thereby retaining the assembly always in the same position.

As is apparent, a number of spacers 12 are provided and by selectively distributing the same on both sides of the magnet and by removing or adding respectively, spacers, any desired frictional pressure between the brake discs 8 and 9 may be conveniently obtained.

To permit observation of the components of the brake especially when the same is assembled, casing 13 is preferably made of transparent material and recesses 19 are provided in the body of member 2.

Fig. 4 shows a brake arrangement which is similar in principle to the previously described arrangement, but non-magnetic brake disc 9 is omitted and the bottom of casing 13 is directly used as the counter surface for magnetic disc 8. In other words, disc 8 coacts with a stationary braking surface thereby providing the differential speed of the coacting braking surfaces required to retain the thread between the braking surfaces.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. A tensioning device for a thread spindle comprising a run-in member having a bore for the passage of thread and a recess disposed transversely and eccentrically relative to the axis of said bore and issuing into the same; and a brake means fitted in said recess, said brake means including two friction members rotatable relative to each other and having coacting friction surfaces extending in the direction of the axis of the bore and situated within the bore for guiding a thread therebetween in a substantially straight line, one of said friction members being made of magnetic material and movable toward the other by magnetic attraction, a mounting for each friction member, said mountings having rotational resistances different one from the other whereby the draw of the thread causes differential relative rotation of the friction members, a permanent magnet attracting the magnetic friction member to bias the friction members toward each other, and spacers selectively insertable between the magnet and the friction members to vary the frictional pressure effected between the friction members by the attraction of the magnetic friction member by the magnet.

2. A tensioning device for a thread spindle comprising a run-in member having a straight bore for the passage of thread and a recess disposed transversely and eccentrically relative to the axis of said bore and issuing into the same; and a brake means fitted in said recess, said brake means including two coacting rotatable friction discs, at least one of said discs being made of magnetic material and movable toward the other by magnetic attraction, the coacting friction surfaces of the discs being situated within the bore and extending in the direction of the axis thereof to guide a thread between said surfaces in a substantially straight line, a mounting for each of said friction discs, said mountings having frictional resistances to rotation of the discs different one from the other, a permanent magnet for attracting said magnetic disc to bias the friction discs toward each other, and spacers selectively insertable between the magnet and the friction discs to vary the frictional pressure effected between the friction discs by the magnetic attraction of the magnetic discs by the magnet.

3. A tensioning device according to claim 2 and further comprising a cup-shaped casing housing the magnet and the spacers fitted in said recess with the open side of the casing facing outwardly, and a closure member closing the open side of the casing.

4. A tensioning device according to claim 3, wherein said recess is formed with an inwardly protruding shoulder, said casing abutting against said shoulder and said closure member being secured within the run-in member to secure the casing in its position within the recess.

5. A tensioning device according to claim 2 and further comprising a cup-shaped casing housing the magnet and the spacers fitted in said recess with the open side of the casing facing outwardly, and a closure member closing the open side of the casing, said casing being of non-magnetic material.

6. A tensioning device according to claim 2 and further comprising a cup-shaped casing housing the magnet and the spacers fitted in said recess with the open side of the casing facing outwardly, a closure member closing the open side of the casing, said spacers being selectively distributable between the magnet and the friction discs and the magnet and the closure member respectively, said recess being formed with an inwardly protruding shoulder and said casing abutting against said shoulder, said closure member being secured within said recess to secure the casing in its position within the recess, and loaded spring means within the casing to bias the casing against said shoulder.

7. A tensioning device according to claim 2 and further comprising a cup-shaped casing made of transparent material housing the magnet and the spacers fitted in said recess, said run-in member being formed with at least one further recess disposed in transverse alignment with said friction discs to form a window for observing the discs through said further recess and the casing.

8. A tensioning device according to claim 2, wherein one of said discs is made of magnetic material and the other of non-magnetic material, a predetermined side of said non-magnetic disc facing said magnetic disc, said magnetic disc being disposed between the bottom of said recess and said other disc, the distance between said bottom of said recess and said other disc permitting planar rotation of said magnetic disc but preventing rotation thereof about a transverse axis whereby said predetermined side of said non-magnetic disc is maintained in facing engagement with said magnetic disc.

9. A tensioning device according to claim 8 and further comprising a cup-shaped casing housing the magnet and the spacers fitted in said recess with the open side of the casing facing outwardly, the bottom of said casing being formed with a bearing hole, said non-magnetic disc having a pivot journalled in said bearing hole.

10. A tensioning device according to claim 1 and further comprising a cup-shaped casing housing the magnet and the spacers fitted in said recess with the open side of the casing facing outwardly, the bottom of said casing constituting said stationary friction member and said other member being in the form of a disc.

11. A tensioning device according to claim 10, wherein said casing is made of non-magnetic material and said rotatable disc is made of magnetic material.

References Cited in the file of this patent

UNITED STATES PATENTS

| | | |
|---|---|---|
| 1,456,263 | Van Ness | May 22, 1923 |
| 2,240,152 | Carter | April 29, 1941 |
| 2,478,926 | Kingsbury | Aug. 16, 1949 |
| 2,571,109 | Carter | Oct. 16, 1951 |
| 2,614,773 | Ammerall | Oct. 21, 1952 |

FOREIGN PATENTS

| | | |
|---|---|---|
| 57,269 | Switzerland | Oct. 5, 1911 |